United States Patent [19]
Herbst et al.

[11] Patent Number: 5,558,915
[45] Date of Patent: Sep. 24, 1996

[54] HIGH-VOLTAGE INSTALLATION

[75] Inventors: Ingo Herbst, Greifensee; Ralf-Dieter Pietsch, Oberrorhrdorf, both of Switzerland

[73] Assignee: ABB Research Ltd., Zurich, Switzerland

[21] Appl. No.: 350,840

[22] Filed: Dec. 7, 1994

[30] Foreign Application Priority Data

Dec. 28, 1993 [DE] Germany ............... 43 44 764.3

[51] Int. Cl.⁶ .................................................. B32B 9/00
[52] U.S. Cl. ...................... 428/76; 428/464; 428/408; 174/35 MS
[58] Field of Search ............... 428/408, 76, 688, 428/689, 464; 204/157.47, 157.4; 219/121.59, 121.36, 121.51, 121.48; 423/445.8; 174/35 R, 36, 35 MS

[56] References Cited

U.S. PATENT DOCUMENTS

| | | |
|---|---|---|
| 5,227,038 | 7/1993 | Smalley et al. . |
| 5,316,636 | 5/1994 | Bunshah .............................. 204/157.47 |
| 5,393,955 | 2/1995 | Simmons ............................ 219/121.59 |

FOREIGN PATENT DOCUMENTS

| | | |
|---|---|---|
| 3030453 | 3/1981 | Germany . |
| 2711260 | 7/1990 | Germany . |
| 3938200 | 5/1991 | Germany . |
| 4035387 | 5/1992 | Germany . |
| 4120309 | 12/1992 | Germany . |
| 4142959 | 7/1993 | Germany . |
| 4214975 | 11/1993 | Germany . |
| 4327280 | 2/1994 | Germany . |

OTHER PUBLICATIONS

Bucholz, S., u.a.: Leitfähige Substrate für ultra-dünne organische Filme. Abstracts aus Advanced Materials, 1991, Nr. 1, S.51ff.
Hocken, J., u.a.: Elektrisch leitfähige Pigmente zur antistischen Ausrüstung von polymeren Beschichtungsstoffen. In: Farbe + Lack, 98. Jr., Nr. 1, 1992, S. 19–24.

Primary Examiner—Patrick Ryan
Assistant Examiner—Patrick Jewik
Attorney, Agent, or Firm—Burns, Doane, Swecker & Mathis

[57] ABSTRACT

This high-voltage installation has a metallic enclosure (1) which is filled with insulating gas and surrounds voltage-carrying active parts. In addition, it has at least one at least partial protective coating (7, 9, 10) either on the internal surface of the enclosure (1) or on the external surface over the active parts, or at least one at least partial protective coating (7, 9, 10) both on the internal surface of the enclosure (1) and on the external surface of the active parts.

It is intended to provide a high-voltage installation in which free electrons are also reliably removed from the insulating gaps and in which partial discharges generated by free particles are reduced to noncritical values of intensity. This is achieved in that the at least one protective coating (7, 9, 10) is doped with at least one fullerene which absorbs free electrons. Protective coatings which have a surface of vapor-deposited fullerene are also particularly suitable.

12 Claims, 1 Drawing Sheet

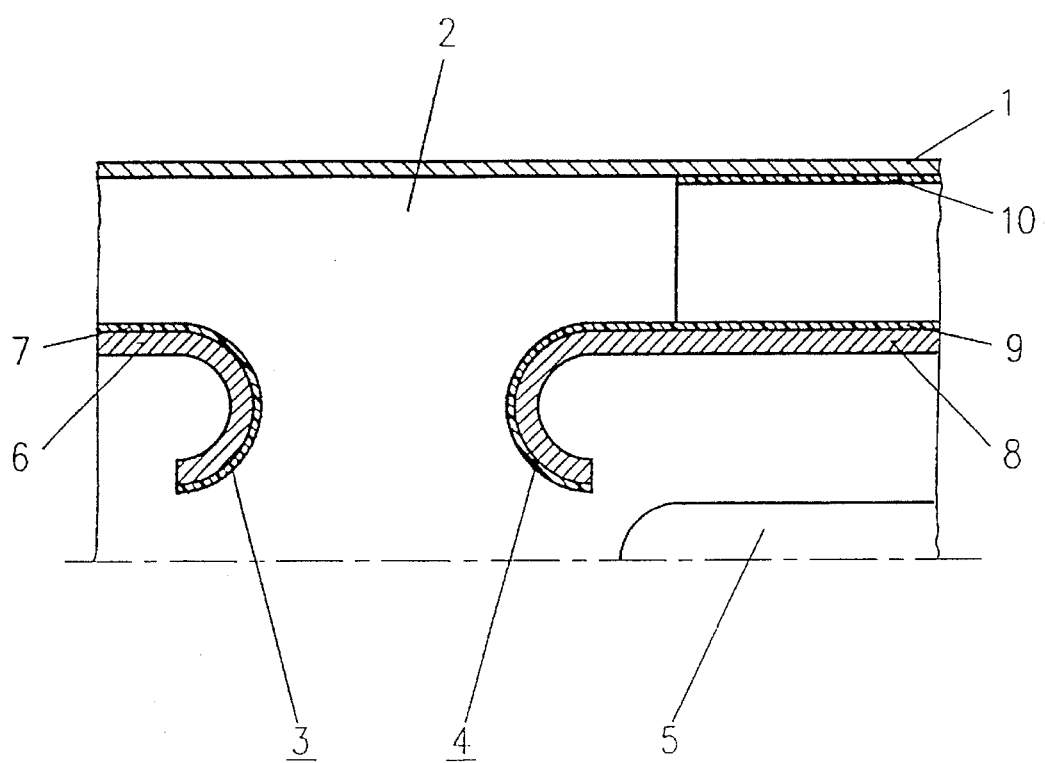

HIGH-VOLTAGE INSTALLATION

BACKGROUND OF THE INVENTION

1. Field of the Invention

The invention proceeds from a high-voltage installation in accordance with the preamble of claim 1.

2. Discussion of Background

High-voltage installations are known which have a grounded metallic enclosure which is filled with an insulating gas, for example $SF_6$, and whose internal surface situated opposite the high-voltage-carrying active parts is provided with a protective coating. This protective coating is to render this surface smooth, inter alia so that it can be cleaned without fibers or other residues of cleaning agents being retained by surface roughnesses of the internal surface, as a result of which the dielectric strength of the insulating-gas gap would be reduced. The surface of the active parts in such installations is often provided with a similar protective layer.

The publication DE 41 20 309 Al discloses a high-voltage installation which has a metallic enclosure which is filled with insulating gas and surrounds the voltage-carrying active parts. Provided on the internal surface of the enclosure as well as on the external surface of the active parts is a protective coating. In the case of this high-voltage installation, a reduction in the dielectric strength of the insulating-gas gap as a result of freely moving or fixed particles can occur only to a limited extent since the protective coatings are specially formed and are at least partly coated with a second protective coating. In such a high-voltage installation, electrically conductive particles do not as a rule move. Furthermore, the intensity of partial discharges caused by particles is markedly reduced in comparison with uncoated surfaces as a result of said coating. Free electrons, however, are not as a rule reliably rendered harmless in this type of high-voltage installation. The dielectric strength of the insulating-gas gap could, however, be improved if electrons which are produced in the vicinity of surfaces as a result of partial discharges at peaks or particles were captured. In addition, the application of a second protective coating is comparatively expensive.

SUMMARY OF THE INVENTION

Accordingly, one object of the invention as characterized in the independent claims is to provide a high-voltage installation in which free electrons are also reliably removed from the insulation gaps and in which partial discharges generated by free particles are reduced to noncritical values of intensity.

The advantages achieved by the invention are essentially to be seen in the fact that free electrons, which may, for example, be produced by switching processes or by discharge processes, are absorbed by the fullerene before they are able to initiate a flashover.

The high-voltage installation has a metallic enclosure which is filled with insulating gas and surrounds voltage-carrying active parts. It has in addition at least one partial coating either on the internal surface of the enclosure or on the external surface of the active parts, or at least one at least partial protective coating both on the internal surface of the enclosure and on the external surface of the active parts. The at least one protective coating is doped with at least one fullerene.

The protective coating can be formed as a layer which is vapor-deposited directly on the appropriate surface and composed of at least one fullerene. However, the protective coating may also be applied to the appropriate surface as a lacquer doped with at least one fullerene, an epoxy lacquer or a lacquer based on polyethylene being provided as lacquer.

A particularly good action is produced if the at least one fullerene is concentrated at the surface of the lacquer or of the protective coating.

Preferably, $C_{60}$ is used as the at least one fullerene. Fullerenes having larger molecules may, however, also be used.

The dependent claims relate to further developments of the invention.

BRIEF DESCRIPTION OF THE DRAWINGS

A more complete appreciation of the invention and its further development and many of the attendant advantages thereof will be readily obtained as the same becomes better understood by reference to the following detailed description when considered in connection with the accompanying drawing, which shows only one method of implementation, wherein:

The sole FIGURE shows a partial section through a high-voltage installation according to the invention.

DESCRIPTION OF THE PREFERRED EMBODIMENTS

Referring now to the drawing, the FIGURE shows a partial section through a high-voltage installation according to the invention. An essentially cylindrically constructed, pressure-proof metallic enclosure 1 encloses an interior space 2 filled with insulating gas, for example $SF_6$. Disposed in the centre of the enclosure 1 are active parts, of which, however, only one switching point is shown in very simplified form. On the one side of the switching point only a screen 3 which concentrically surrounds a fixed contact, which is not shown, is shown. Also not shown are the contacts for the rated-current transfer, which are situated inside the screen 3. Shown on the other side of the switching point is a screen 4 which concentrically surrounds a moving contact 5, which is shown in the switched-off position. Here, again, the contacts necessary for the rated-current transfer, which are situated inside the screen 4, are not shown. The switching point shown may be part of a circuit-breaker or of an isolator or of a load interrupter switch or of a grounding switch or a grounding isolator.

The screen 3 is made of a metal sheet 6 which is coated with a protective coating 7 on the side facing the enclosure 1 and on the side facing the oppositely situated screen 4. The screen 4 is made of a metal sheet 8 which is coated with a protective coating 9 on the side facing the enclosure 1 and on the side facing the oppositely situated screen 3. The internal surface of the enclosure 1 is also entirely or partially coated with a protective coating 10. The protective coatings 7, 9 and 10 comprise, as base material, for example an epoxy lacquer into which fullerenes, in this case $C_{60}$ in particular, are introduced. Lacquer based on polyethylene as base material can also be used. The production of such fullerenes is described in patent specification U.S. Pat. No. 5,227,038. In addition to such fullerenes, conductive or semiconducting dopants, for example $TiO_2$ components or conductively coated $Al_2O_3$ or, alternatively, a mixture of various substances, which dopants are standard for such protective coatings, may also be introduced. Still other electrically conductive substances are also conceivable for introduction into said coating. In each case, the conductive protective coating renders the surface of the part coated therewith similar to a surface which acts as dielectrically smooth. Any fine peaks which project slightly out of the surface no longer now have a dielectrically harmful effect since they are situated inside the electrically conductive or dielectrically active protective coating.

It is possible to provide the internal surface of the enclosure 1 and the external surface of the active parts entirely with such protective coatings. It may, however, also be expedient to provide said protective coating in only one area or in a plurality of areas of the high-voltage installation, and, to be specific, particularly at those points where switching gases or other switching residues may occur. However, for some applications it is also sufficient to provide only the active parts with a protective coating, and, to be specific, this may be done in one or more regions of the high-voltage installation.

If the fullerene is concentrated at the surface of the lacquer, this results in a particularly high efficiency of the fullerene. The fullerene $C_{60}$ is particularly suitable for use in high-voltage installations because of its good receptivity for free electrons. In addition, it can be produced comparatively simply and is therefore particularly well suited for a technical application. Fullerenes having a number of carbon atoms higher than $C_{60}$ can also be used in this connection.

Fullerene layers which are vapor-deposited directly on the appropriate surface and composed of at least one fullerene may also be used as protective coating 7, 9, 10. In this case, an adhesive based on epoxy resin is often applied to the surface as additional adhesive layer prior to the vapor deposition of the fullerene. In this way, a particularly firm joint is achieved between the fullerene molecules and the appropriate surface. If a single-component adhesive is used as adhesive, this results in a particularly simple processing. The single-component adhesive Araldite AV 119 of the CIBA-GEIGY company (Araldite is a Registered Trade Mark of the CIBA-GEIGY company) can be processed particularly simply since it is thixotropic. Since the vapor deposition is carried out at comparatively high temperatures, the single-component adhesive Araldite AV 119 cures substantially during this process. Should, however, the degree of curing still be insufficient an additional curing must be carried out in an oven.

In the production of said protective coating 7, 9, 10, the metallic surfaces are, as a rule, first sand-blasted immediately before the application of the single-component adhesive Araldite AV 119 as additional layer in order to achieve a good bonding of the adhesive layer to the surface concerned. After sandblasting, the roughened surfaces are degreased chemically with a grease solver such as acetone or trichloroethylene. Thereafter, the single-component adhesive Araldite AV 119 is then applied uniformly to the degreased surface. The single-component adhesive Araldite AV 119 is a formulated epoxy-resin adhesive based on bisphenol A which can be processed easily and without dripping.

It is possible that peaks which may be conductive and which result in field distortions may be present at the surface at the junction between the surface and the adhesive layer. To smooth out such field distortions, it may be expedient to dope the single-component adhesive with a conductive or semiconducting powder in order, in this way, to make the adhesive layer into an equipotential surface with whose aid a field distortion is avoided in this region. In this way, it is possible to avoid with certainty that partial discharges occur in this region.

To explain the mode of action, the sole FIGURE may now be considered somewhat more closely. If the high-voltage installation is carrying voltage and if the switching point is in the switched-off position, as is shown diagrammatically in the FIGURE, free electrons are always generated by ionizing radiation and by partial discharges initiated by freely moving or fixed particles. Free electrons produced in this way may generate further free electrons in avalanche fashion, and, under unfavorable circumstances, if, for example, the insulation has already been somewhat weakened as a consequence of a previous overload, this may result in a flashover between the active parts and the grounded enclosure 1. Such flashovers are avoided with considerable certainty if the free electrons are already absorbed by the fullerenes present in the protective coating 7, 9 and consequently rendered harmless immediately after their production.

If a conventional high-voltage installation is systematically provided with these fullerene-containing protective coatings 7, 9, 10, the operational safety of said high-voltage installation is thereby appreciably increased.

However, if the previous safety margins are considered as adequate, the dimensions of the high-voltage installation provided with fullerene-containing protective coatings 7, 9, 10 can be markedly reduced with respect to the dimensions of an equivalent conventional high-voltage installation, and this entails appreciable economic advantages.

The fullerene-containing protective coatings 7, 9, 10 have an advantageous effect even if they are in contact with gas clouds produced during switching processes and containing free electrons. They, or the fullerenes, absorb said free electrons and thereby accelerate, for example, the increase in the insulation resistance between the screens 3 and 4 and, consequently, also between the contacts of the switching point. This accelerated dielectric recovery of the switching point has the consequence that the breaking capacity of said switching point is raised somewhat, or its safety is increased.

Obviously, numerous modifications and variations of the present invention are possible in light of the above teachings. It is therefore to be understood that within the scope of the appended claims, the invention may be practiced otherwise than as specifically described herein.

| LIST OF DESIGNATIONS | |
|---|---|
| 1 | Enclosure |
| 2 | Interior Space |
| 3, 4 | Screen |
| 5 | Contact |
| 6 | Metal sheet |
| 7 | Protective coating |
| 8 | Metal sheet |
| 9, 10 | Protective coating |

What is claimed as new and desired to be secured by Letters Patent of the United States is:

1. A high: voltage installation with at least one voltage carrying active part, the high-voltage installation having a metallic enclosure which is filled with insulating gas and surrounds the active part, and having at least one at least partial protective coating on at least one of an appropriate surface of an internal surface of the enclosure and an external surface of the active parts, wherein the at least one protective coating is doped with at least one fullerene, and the protective coating is applied to the appropriate surface as a lacquer doped with at least one fullerene.

2. The high-voltage installation as claimed in claim 1, wherein the lacquer comprises a material selected from the group consisting of epoxy or polyethylene.

3. The high-voltage installation as claimed in claim 1, wherein the at least one fullerene is concentrated at a surface of the lacquer.

4. The high-voltage installation as claimed in claim 1, wherein $C_{60}$ is used as the at least one fullerene.

5. The high-voltage installation as claimed in claim 1, wherein at least one screen built on to the active part and dielectrically protecting switching contacts is provided with the protective coating.

6. A high voltage installation with at least one voltage carrying active part, the high-voltage installation having a metallic enclosure which is filled with insulating gas and surrounds the active part, and having at least one at least partial protective coating on at least one of an appropriate surface of an internal surface of the enclosure and an external surface of the active parts, wherein the at least one protective coating is doped with at least one fullerene, the protective coating is formed as a layer of vapor deposited directly on the appropriate surface and composed of at least one fullerene, and the appropriate surface is provided with a layer which improves adhesion of the fullerene prior to the vapor deposition.

7. The high-voltage installation as claimed in claim 6, wherein a single-component adhesive is provided for the layer which improves the adhesion of the fullerene.

8. The high-voltage installation as claimed in claim 7, wherein an adhesive based on epoxy resin is provided as the single-component adhesive.

9. The high-voltage installation as claimed in claim 6, wherein $C_{60}$ is used as the at least one fullerene.

10. The high-voltage installation as claimed in claim 6, wherein at least one screen built on to the active part and dielectrically protecting switching contacts is provided with the protective coating.

11. The high-voltage installation as claimed in claim 6, wherein the active part includes at least one movable and one fixed contact.

12. The high-voltage installation as claimed in claim 1, wherein the active part includes at least one movable and one fixed contact.

* * * * *